United States Patent [19]

Shinjo et al.

[11] Patent Number: 4,771,654
[45] Date of Patent: Sep. 20, 1988

[54] GEAR SYSTEM

[76] Inventors: Kinichi Shinjo, 7-27-5, Ikegami, Ota-ku, Tokyo, 146; Mutsukazu Go, 2510-11, Nagara, Gifu-shi, Gifu-ken, 502, both of Japan

[21] Appl. No.: 730,719
[22] PCT Filed: Sep. 17, 1984
[86] PCT No.: PCT/JP84/00447
§ 371 Date: May 3, 1985
§ 102(e) Date: May 3, 1985
[87] PCT Pub. No.: WO85/01334
PCT Pub. Date: Mar. 28, 1985

[30] Foreign Application Priority Data

Sep. 17, 1983 [JP] Japan ................. 58-171663
Oct. 20, 1983 [JP] Japan ................. 58-196907

[51] Int. Cl.⁴ ............................................. F16H 1/28
[52] U.S. Cl. ......................................... 74/801; 74/785; 74/409
[58] Field of Search ............... 74/801, 750 R, 752 F, 74/409, 410, 411, 785

[56] References Cited

U.S. PATENT DOCUMENTS

| | | | |
|---|---|---|---|
| 2,231,784 | 2/1941 | Von Thungen | 74/410 |
| 2,496,857 | 2/1950 | Cronstedt et al. | 74/410 |
| 2,547,877 | 4/1951 | Lucia | 74/801 |
| 2,698,526 | 1/1955 | Beier | 74/411 |
| 2,749,778 | 6/1956 | Kuhn | 74/801 |
| 3,839,922 | 10/1974 | Hiersig et al. | 74/410 |
| 3,943,780 | 3/1976 | Klaue | 74/785 X |
| 4,524,643 | 6/1985 | Ziegler et al. | 74/785 X |

FOREIGN PATENT DOCUMENTS

| | | | |
|---|---|---|---|
| 720040 | 4/1942 | Fed. Rep. of Germany | 74/801 |
| 39-18070 | 8/1964 | Japan . | |
| 6762 | 2/1977 | Japan . | |
| 112055 | 9/1977 | Japan . | |

*Primary Examiner*—Leslie A. Braun
*Assistant Examiner*—David Novais
*Attorney, Agent, or Firm*—Jordan and Hamburg

[57] ABSTRACT

A gear system has a planetary gear (5) mounted on a conical main shaft (8) in such a manner to move axially thereon, the planetary gear being in meshing engagement with a central gear (3). A receiving device is provided to receive thrust generated at the planetary gear (5). When a plurality of planetary gears (5) are employed, a clearance (S) formed between the surface of the conical main shaft (8) and an inner peripheral surface of a bearing (17) of each planetary gear (5) is changed according to the axial position of each gear (5) on the conical shaft (8) under the influence of a thrust counterbalancing device. Thus, a distance between the center axis of the conical shaft (8) and that of the planetary gear (5) is thereby increased or decreased to effect even application of load to each planetary gear (5).

16 Claims, 21 Drawing Sheets

FIG.10
FIG.9
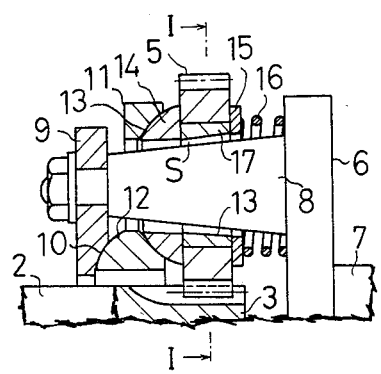
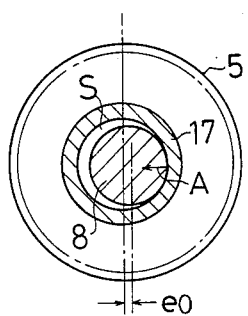
FIG.12
FIG.11
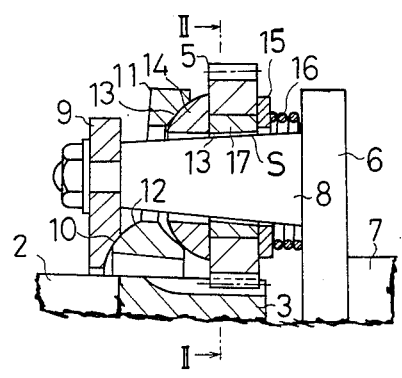
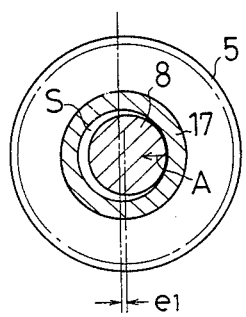
FIG.14
FIG.13
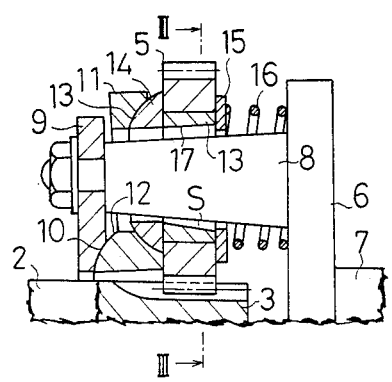
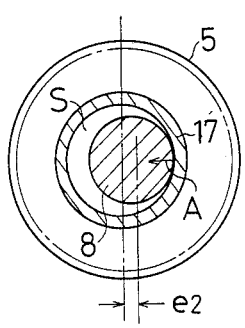

FIG. 24
FIG. 23
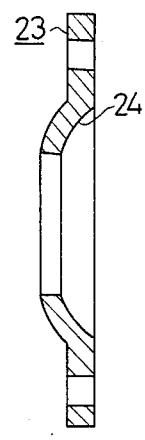
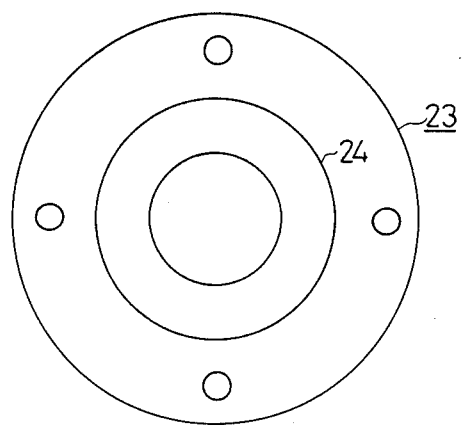
FIG. 25
FIG. 26
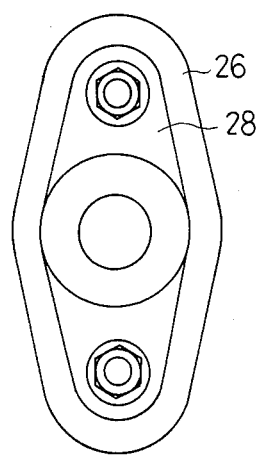
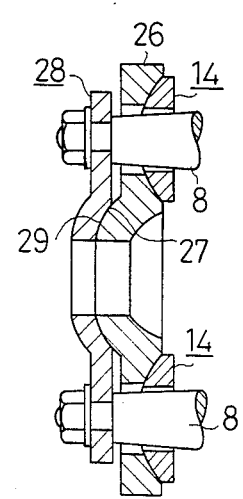

GEAR SYSTEM

BACKGROUND OF THE INVENTION

This invention relates to a gear system and is particularly concerned with a gear system such as a planetary gear system wherein a plurality of gears are in meshing engagement with the central gear, transmission power being equally divided into said plurality of gears.

As an example of such gear system, there has hitherto been known a speed reducing mechanism for use in connection with a geared motor as shown in FIG. 1. In such a speed reducing mechanism, an input shaft 2 supported in a motor casing 1 is operatively associated with an external gear 3 which serves as a sun gear. Three planetary gears 5 are disposed between the external gear 3 and a stationary gear 4 for meshing purposes. Associated operatively with an output shaft 7 is a carrier 6 adapted to rotatably support the planetary gears 5. Now, in such a planetary gear mechanism, assuming that central distances L1 between the respective adjacent planetary gears are exactly coincident with each other and central distances L2 between the external gear 3 and the adjacent planetary gears are also exactly coincident with each other as shown in FIG. 2, the planetary gears are disposed in equal spaced relationship with each other. Therefore, load is evenly applied to the respective planetary gears 5 provided that the respective gears 3, 4 and 5 have no error. Thus, these gears 3, 4 and 5 may be operated as positively as expected. In practice, however, coincidence of each of the central distances L1 and L2 is hardly accomplished. Furthermore, bearing portions of the respective planetary gears 5 and the gears 3, 4 and 5 are naturally never free of errors. As a consequence, even application of the load is hardly effected and power is not equally divided. In addition, there is a disadvantage that noises occur due to vibrations of the whole speed reducing mechanism.

SUMMARY OF THE INVENTION

This invention has been made in order to overcome the foregoing disadvantages and has for its object to provide a gear system which permits even application of load to a plurality of gears meshing with the central gear so as to ensure equal division of power and which prevents occurrence of noises due to vibrations thereof.

Another object of the invention is to provide a gear system which is compact and is readily incorporated into a wide variety of machines.

A further object of the invention is to provide a gear system which is simple in construction and is readily and economically manufactured.

Yet another object of the invention is to provide a gear system which prevents disorder of gears upon generation of excessive thrust.

According to this invention, the planetary gear 5 is mounted on the main shaft 8 (hereinafter, referred to as a conical shaft) in such a manner to move axially thereon, said planetary gear 5 being in meshing engagement with the gear 3. Thrust in the direction of the small diameter end of the conical shaft 8 is generated at the gear 5 depending upon variations in load applied to the gear 5. A receiving means is provided to receive the gear 5 movable in the direction of the small diameter end of the conical shaft 8. The receiving means may also serve as a thrust measuring means to measure the amount of the thrust generated at the gear 5.

Also, according to the invention, a plurality of gears 5 may be provided. In this case, the receiving means also serves as a thrust counterbalance means to provide equal application of load responsive to the thrust generated at the respective gears 5. Under the influence of this thrust counterbalance means, as the axial position of the gears on the shafts 8 is changed, a clearance S formed between the surface of each shaft 8 and the inner peripheral surface of bearing 17 of each gear 5 is changed accordingly. Consequently, the center axis of each conical shaft 8 is deviated from that of each gear 5. In this state, load is reduced in the gear with now high load applied thereto whereas load is increased in the gear 5 with now low load applied thereto. Hence, equal load is applied to the respective gears 5 and power is equally divided thereinto, thereby drastically reducing noises.

BRIEF DESCRIPTION OF THE DRAWINGS

FIG. 3 to FIG. 14 respectively show a first embodiment of the invention and FIG. 3 is a front view of a planetary gear mechanism;

FIG. 4 is a vertical sectional view of the planetary gear mechanism;

FIG. 5 is a front view of a backing plate;

FIG. 6 is a sectional view of the backing plate;

FIG. 7 is a front view of a thrust backing plate;

FIG. 8 is a sectional view of the thrust backing plate;

FIG. 9 a sectional view, in part, showing the manner in which a planetary gear is centrally positioned on a conical shaft;

FIG. 10 a sectional view taken along the line I—I of FIG. 9;

FIG. 11 a sectional view, in part, showing the manner in which the planetary gear is positioned closer to the large diameter end of the conical shaft;

FIG. 12 is a sectional view taken along the line II—II of FIG. 11;

FIG. 13 is a sectional view, in part, showing the manner in which the planetary gear is positioned closer to the small diameter end of the conical shaft;

FIG. 14 a sectional view taken along the line III—III of FIG. 13;

FIG. 15 to FIG. 24 respectively show a second embodiment of the invention and FIG. 15 is a front view of a planetar gear mechanism;

FIG. 16 is a sectional view taken along the line IV—IV of FIG. 15;

FIG. 17 a sectional view taken along the line V—V of FIG.

FIG. 18 a sectional view taken along the line VI—VI of FIG. 15;

FIG. 19 is a front view of a first lever;

FIG. 20 is a sectional view of the first lever;

FIG. 21 is a front view of a second lever;

FIG. 22 is a sectional view of the second lever;

FIG. 23 is a front view of a backing plate;

FIG. 24 is a sectional view of the backing plate;

FIG. 25 is a front view showing incorporation of a lever into a plate in a third embodiment;

FIG. 26 is a sectional view showing incorporation of the lever into the backing plate illustrated in FIG. 25;

FIG. 31 is a vertical sectional view of the planetary gear mechanism;

FIG. 32 is a sectional view, in part, showing the manner in which the planetary gear is mounted on the conical shaft under low loading conditions;

FIG. 33 is a sectional view taken along the line VIII—VIII of FIG. 32;

FIG. 34 is a sectional view, in part, showing the manner in which the planetary gear is mounted on the conical shaft under high loading conditions;

FIG. 35 is a sectional view taken along the line IX—IX of FIG. 34;

FIG. 38 is a vertical sectional view of the planetary gear mechanism shown in FIG. 37;

FIG. 39 is a perspective view of a common support ring;

FIG. 40 is a perspective view of a wave ring spring;

FIG. 41 a view showing the wave ring spring in use;

DETAILED DESCRIPTION OF THE PREFERRED EMBODIMENTS

The invention will now be described in greater detail with reference to illustrative embodiments shown in the accompanying drawings.

In this invention, the gear 5 is moved under thrust in the direction of the small diameter end of a main shaft 8 of conical configuration (hereinafter referred to as a conical shaft) as greater power is divided into the gear 5, and is, then, received by a receiving means which also functions to counterbalance the thrust applied thereto. It should be mentioned, therefore, that such receiving means will be described with reference to a thrust counterbalance means.

In a first to a fourth embodiment, the gear 5 having a lesser amount of divisional power is forcedly moved in the direction of the large diameter end of the conical shaft 8 by means of a thrust counterbalance means constructed of a lever and/or a thrust backing plate to thereby transmit more power. On the other hand, the gear 5 which now has a greater amount of divisional power is forcedly moved in the direction of the small diameter end of the conical shaft 8 by means of the same to thereby reduce the amount of power to transmit. In this manner, the plurality of gears 5 have the same thrust and thus, transmit an equal amount of power.

Figure 1:
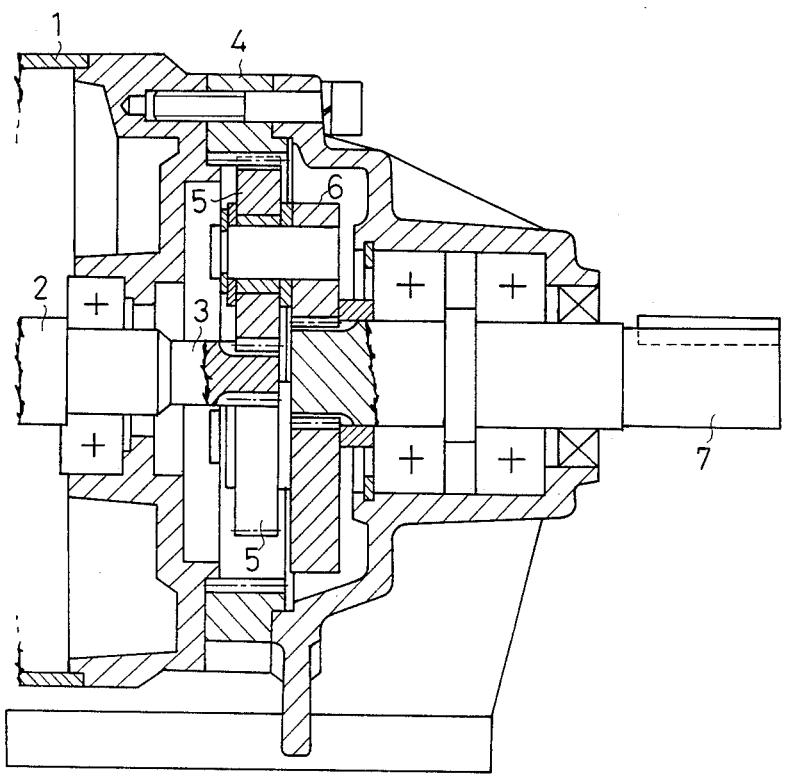
FIG. 1 is a sectional view of a speed reducing mechanism for use in a geared motor.
Figure 2:
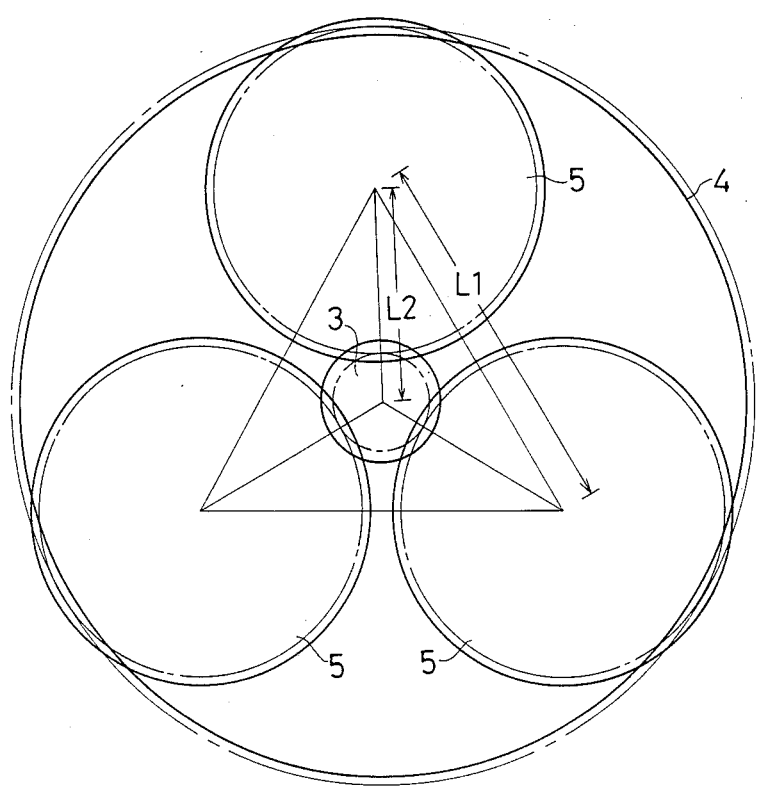
FIG. 2 is a schematic view showing a planetary gear mechanism only, in the speed reducing mechanism.
Figure 3:
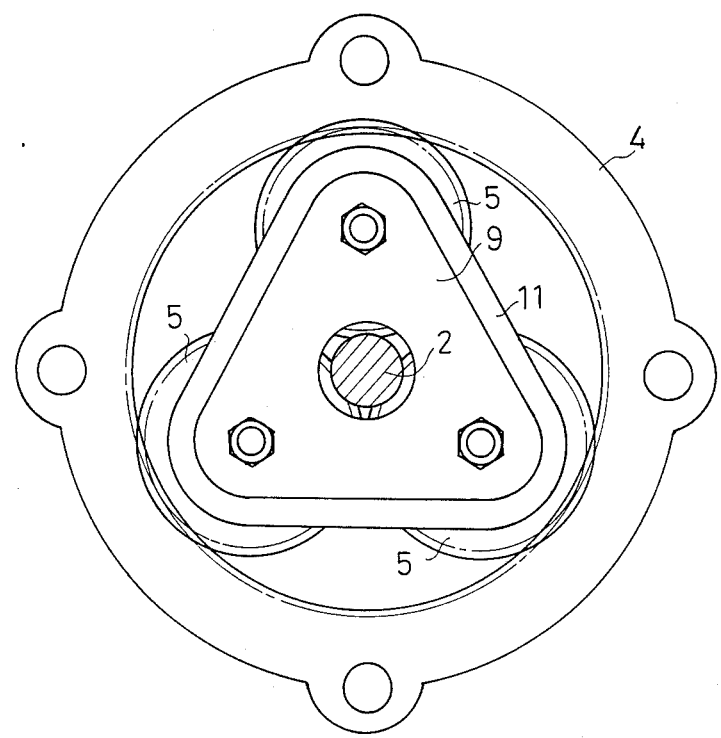
Figure 4:
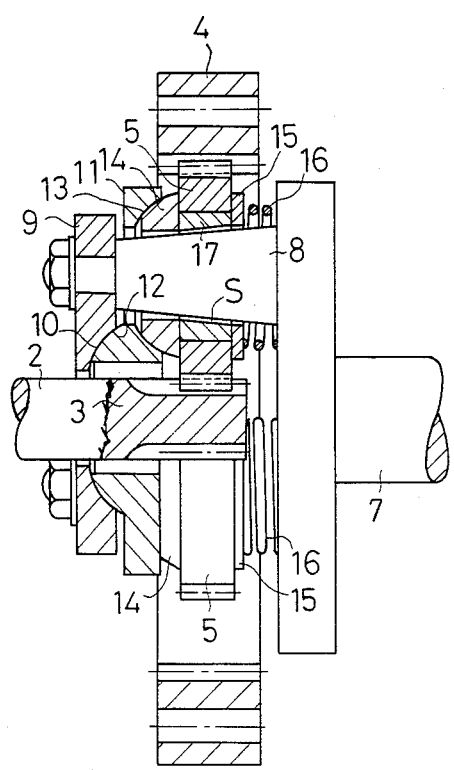
Figure 6:
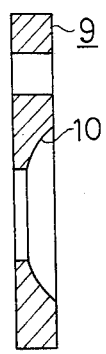
Figure 5:
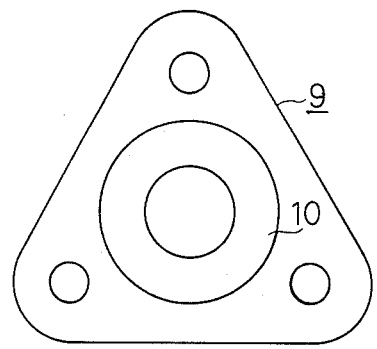
Figure 8:
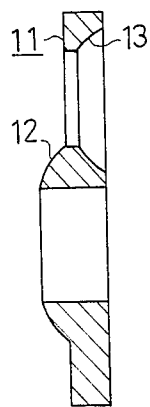
Figure 7:
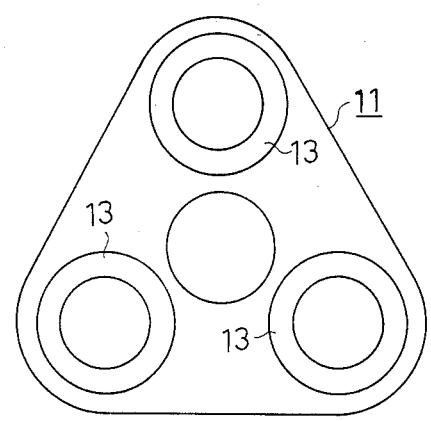

Reference is now made to FIG. 3 to FIG. 14 respectively illustrating the first embodiment of the invention. As shown in FIG. 3 and FIG. 4, the three conical shafts 8 (only one shaft is shown in FIG. 4) are fixed to one side of the carrier at 120° intervals. Fixed to the front end of each of the conical shafts 8 is a backing plate 9, as shown in FIG. 5 and FIG. 6. The backing plate 9 is formed with a spherically concaved surface 10. Fitted slidably in the concaved surface 10 of the backing plate 9 is a spherically convexed surface 12 of a thrust backing plate 11 acting as a thrust counterbalance means shown in FIGS. 7 and 8. The thrust backing plate 11 is formed with three spherically concaved surfaces 13 at 120° intervals in the opposite direction from the convexed surface 12. Fitted in this concaved surface 13 is a washer 14 having a spherical surface, which is, in turn, in contact with the planetary gear 5. Incorporated between the planetary gear 5 and the carrier 6 are a washer 15 and a resilient member 16. It will be noted that a helical spring is employed as the resilient member 16.

In such an arrangement, when different thrust in a direction of the small diameter end of the conical shaft 8 occurs at the three planetary gears 5, the thrust backing plate 11 is free to move in an inclined manner. Accordingly, the planetary gear 5 having greater thrust is moved toward the small diameter end of the conical shaft 8, whereas the planetary gear 5 having lesser thrust is moved toward the large diameter end thereof.

As set forth above, when the planetary gear 5 is moved toward the small diameter end of the conical shaft 8, load applied thereto decreases and thus, the thrust becomes less. On the other hand, when the planetary gear 5 is moved toward the large diameter end of the conical shaft 8, such load increases and thus, the thrust becomes large. Therefore, as the thrust occurring therein becomes equal, the load may equally be applied thereto and equal transmission of power may be effected.

Reference is further made to FIG. 9 to FIG. 14 showing variations in transmission power upon axial movement of the planetary gears 5.

When the planetary gear 5 is moved to such a position as shown in FIG. 9, the center axis of the planetary gear 5 is located eccentrically from that of the conical shaft 8 in such a driving direction as shown by an arrow A by a distance e0 as shown in FIG. 10.

When the planetary gear 5 is positioned at the large diameter end of the conical shaft 8 as shown in FIG. 11, a bearing clearance S becomes small and a distance e1 between the center axis of the conical shaft 8 and that of the planetary shaft 5 becomes lesser. Since the planetary gear 5 is moved in the direction opposite to the driving direction shown by the arrow A, more thrust in the direction of the small diameter end of the conical shaft 8 will occur in the planetary gears 5.

When the planetary gear 5 is positioned at the small diameter end of the conical shaft 8 as shown in FIG. 13, the bearing clearance S becomes large and a distance e2 between the center axis of the conical shaft 8 and that of the planetary gear 5 becomes greater. Since the planetary gear 5 is moved in the driving direction shown by the arrow A, less thrust in the direction of the small diameter end of the conical shaft 8 occurs in the planetary gear 5.

When the planetary gears 5 are driven in a direction shown by the arrow A with respect to the conical shaft 8, a bearing 17 is in contact with the peripheral surface at one side of the conical shaft 8 via oil in the form of a film.

In the above gear system, as the load is equally applied to the three planetary gears 5, safety factors for the planetary gears 5 and other components may be established low, permitting the whole gear system to be compact.

Also, the three planetary gears rotate under equal loading conditions whereby noise due to vibrations may be drastically reduced.

In the first embodiment, the number of the planetary gears 5 are three and a plain bearing is used as the bearing 17 therefor. In the second embodiment shown in FIG. 15 to FIG. 24, the number of the planetary gears are four and a needle roller bearing with a thrust ball bearing is used. The thrust counterbalance means is constructed for levers 18a, 18b and 20, a support of each of which is located at their center.

Figure 16:
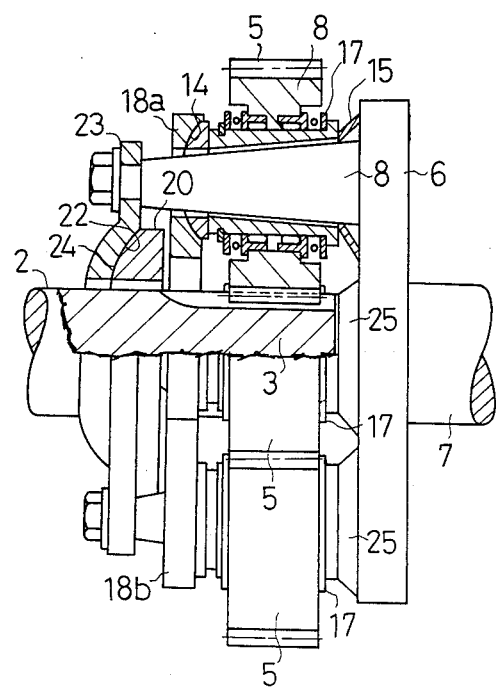
Figure 17:
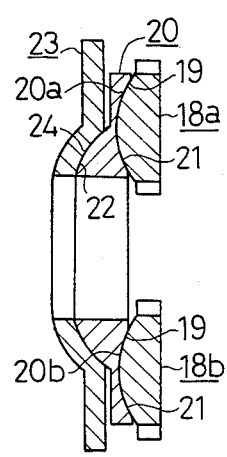
Figure 18:
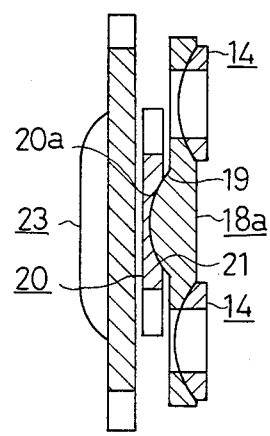
Figure 20:
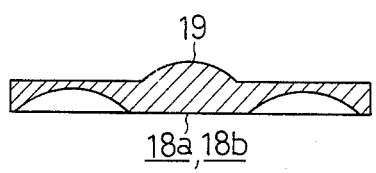
Figure 19:
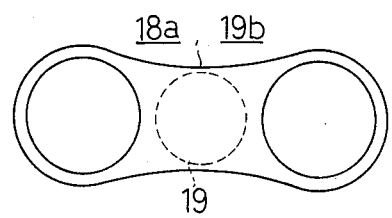
Figure 22:
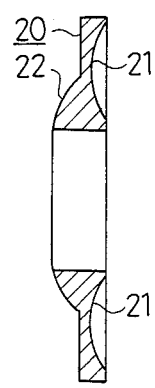
Figure 21:
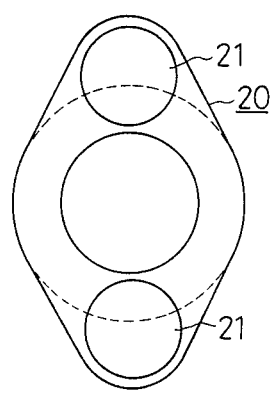

In FIG. 16, thrust generated in the planetary gears in the direction of the small diameter end of the conical shaft 8 is transmitted via the washer to the first levers 18a and 18b shown in FIG. 19 and FIG. 20. Spherically convexed surfaces 19 formed respectively on the central portions of the first levers 18a and 18b are fitted into spherically concaved surfaces 21 of a second lever 20 shown in FIG. 21 and FIG. 22. A spherically convexed surface 22 formed at the central portion of the second lever 20 as shown in FIG. 16 and FIG. 17 is fitted into a spherically concaved surface 24 of a backing plate 23 (FIG. 23 and FIG. 24) fixed to the conical shaft 8.

Figure 15:
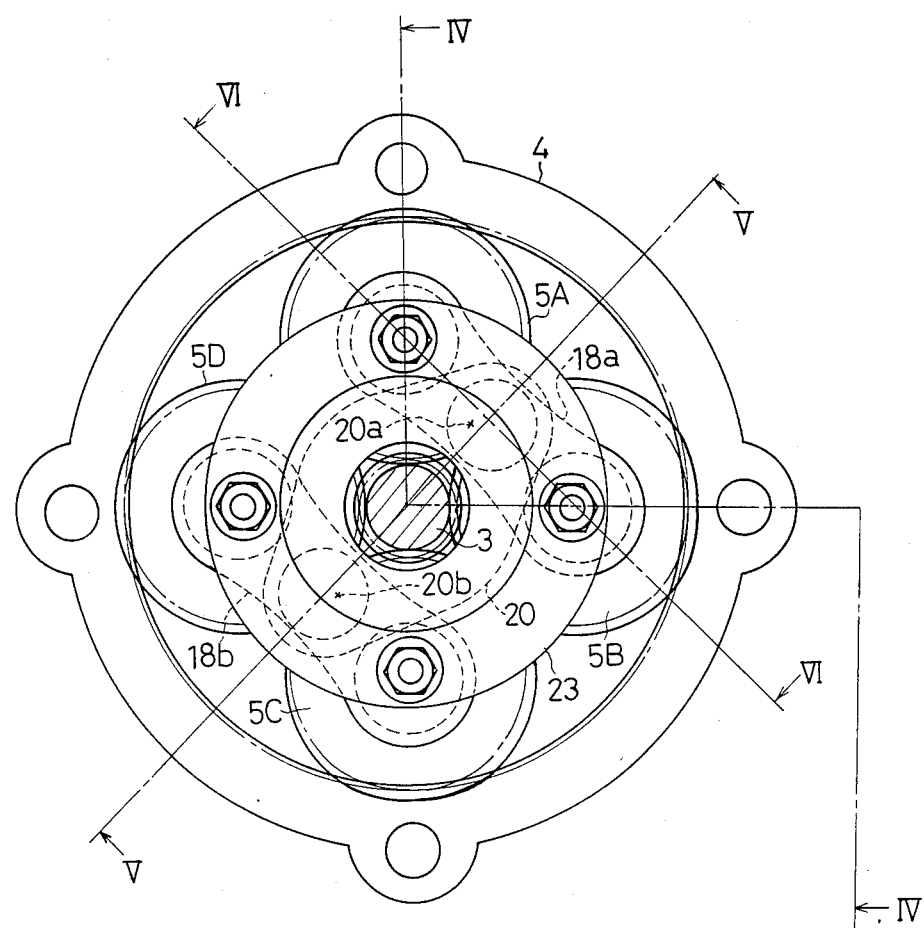

In FIG. 15, thrust of a planetary gear 5A is balanced with that of a planetary gear 5B by means of the first lever 18a. Also, thrust of a planetary gear 5C is balanced with that of a planetary gear 5D by means of the first lever 18b, the total force, the thrust of the planetary gear 5A plus that of the planetary gear 5B is adapted to act on a joining portion 20a (spherically concaved surface 21 and spherically convexed surface 19) where the first lever 18a is fitted in the second lever 20. Further, the total force, the thrust of the planetary gear 5C and the planetary gear 5D, is adapted to act on a joining portion 20b (spherically concaved surface 21 and spherically convexed surface 19) where the first lever 18b is fitted in the second lever 20. As the second lever 20 is supported by the backing plate 23 via the spherically convexed surface 22, the force acting on the joining portion 20a is balanced with that acting on the joining portion 20b. As a result, the same amount of thrust may be generated in the four planetary gears 5A, 5B, 5C and 5D respectively, thereby effecting equal distribution of power.

Reference numeral 25 in FIG. 16 designates a belleville spring as a resilient member.

In the third embodiment shown in FIG. 25 and FIG. 26, the number of the planetary gears 5 used is two. Thrust generated in one of the planetary gears 5 is applied to the lever 26 through the washer 14 having a spherical surface. This lever 26 is formed at its central portion with a spherically convexed surface 27 which is, in turn, in engagement with a spherically convexed surface 27 on a backing plate 28 fixed to the conical shaft 8 for supporting purposes. In this manner, thrust respectively generated in the two planetary gears 5 in the direction of the small diameter end of the conical shaft 8 is balanced and thus, power may equally be divided. In this embodiment, the thrust counterbalance means is comprised of the lever 26.

Figure 27:
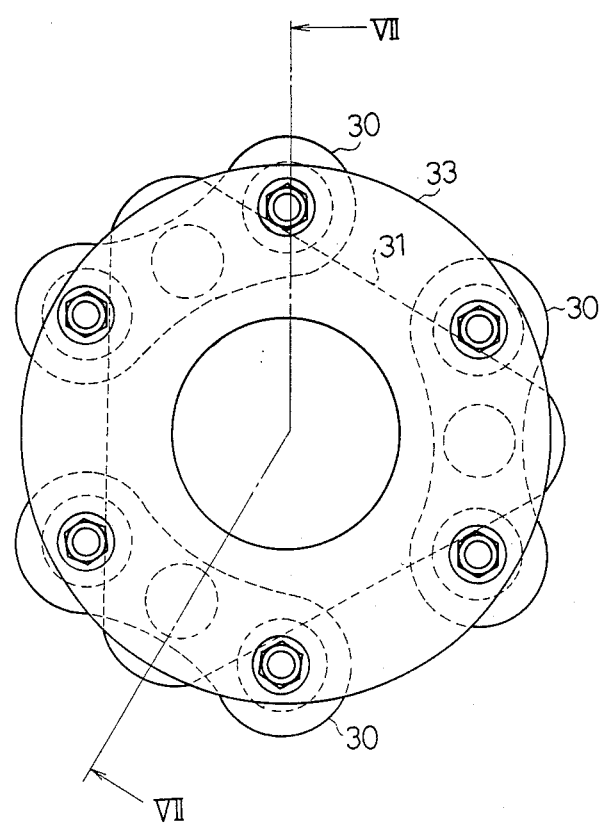
FIG. 27 is a front view showing incorporation of a lever into a thrust backing plate in a fourth embodiment.
Figure 28:
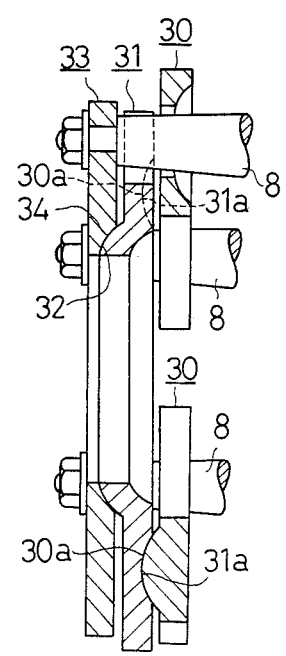
FIG. 28 is a sectional view taken along the line VII—VII of FIG. 27.

In the fourth embodiment shown in FIG. 27 and FIG. 28, thrust respectively generated in six planetary gears 5 is balanced by the combination of three levers 30 and a thrust backing plate 31 having spherically concaved surfaces 31a into which are fitted spherically convexed surfaces 30a of the levers 30 and inclinedly movably supported with respect to the levers 30. Thrust generated in each of the two adjacent planetary gears 5 of the six planetary gears 5 is balanced by means of each of the levers 30. The total force acts on the center of the three levers 30 and is applied to three points on the thrust backing plate 31. The thrust backing plate 31 is formed with a spherically convexed surface 32 into which is fitted a spherically concaved surface 34 of a backing plate 33 fixed to the conical shaft 8 for supporting purposes and is, thus, inclinedly movable. Accordingly, thrust generated in the six planetary gears 5 is balanced and thus, power is equally divided. In this embodiment, the thrust counterbalance means is comprised of the three levers 30 and the thrust backing plate 31.

Figure 29:
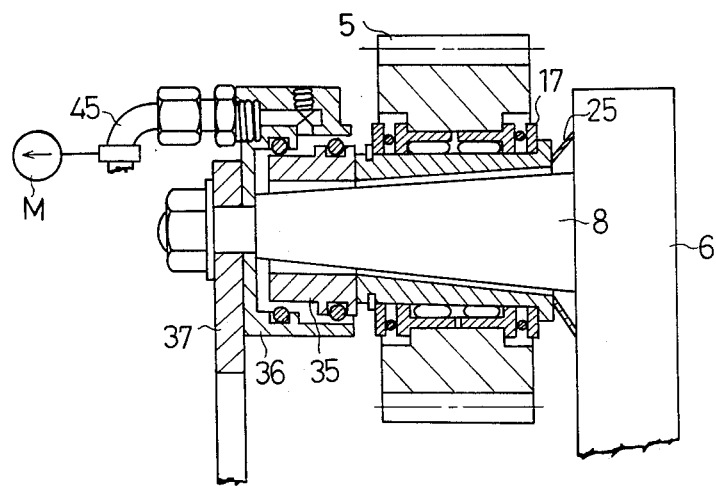
FIG. 29 is a sectional view, in part, showing a fifth embodiment of the invention.

In the fifth embodiment shown in FIG. 29, a hydraulic mechanism is employed as the thrust counterbalance means. Thrust generated in the planetary gears 5 is applied to a piston 35 for receiving purposes. The piston 35 is fitted in a cylinder 36 which is, in turn, fixed to a backing plate 37 fixed to the conical shaft 8.

In the above arrangement, the thrust generated in the planetary gears 5 in the direction of the small diameter end of the conical shaft 8 is transmitted to the piston 35 whereby generation of fluid pressure is effected in fluid filled in the cylinder 36. The fluid in the cylinder 36 is in communication with fluid in the cylinder 36 of the other planetary gear 5 by means of a communicating pipe 45. Accordingly, fluid pressure of each of the cylinders 36 is maintained equal and also, the thrust becomes equal, thereby effecting equal division of power.

The communicating pipe 45 is equipped with a pressure gauge M which is adapted to indicate fluid pressure in a fluid circuit. The amount of thrust to be generated in the planetary gears 5 may, therefore, be confirmed. In case an excessive amount of thrust is generated in the planetary gears 5, operation of the gear system may be stopped so as to prevent disorder thereof. The pressure gauge M constitutes a thrust measuring means. In a sixth embodiment to an eighth embodiment, a spring member 50 is used as a thrust counterbalancing means for the plurality of planetary gears 5.

Figure 33:
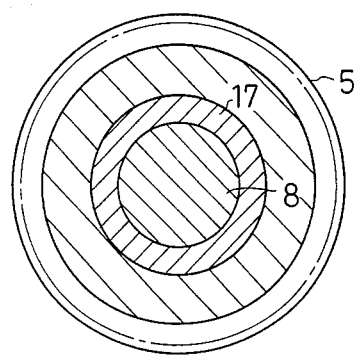
Figure 35:
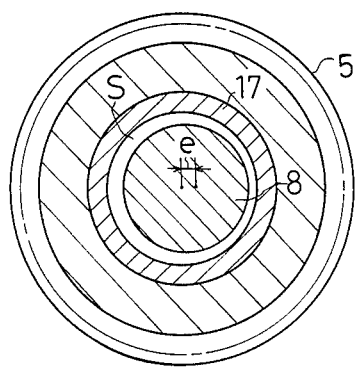
Figure 34:
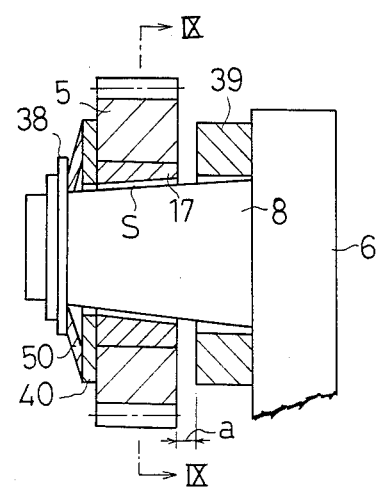
Figure 37:
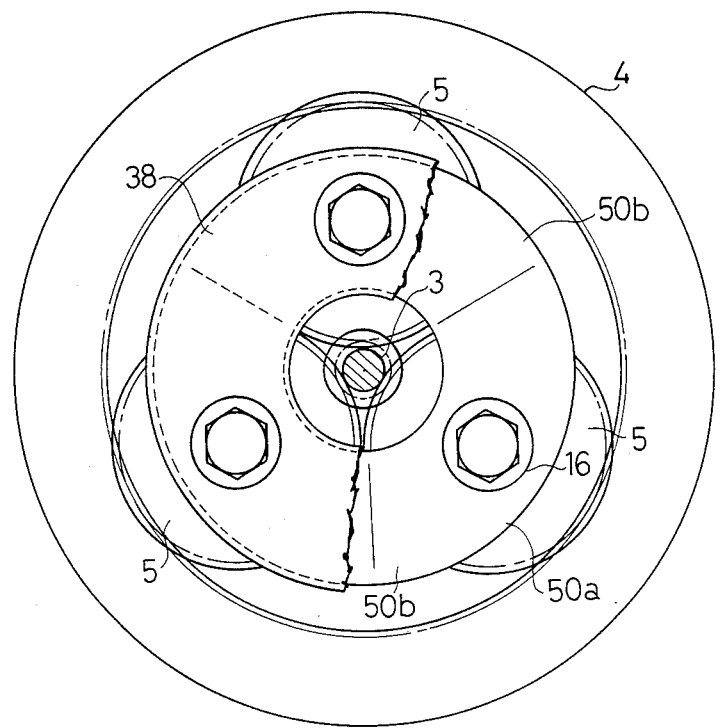
FIG. 37 to FIG. 41 respectively show an eighth embodiment of the invention and FIG. 37 is a front view of a planetary gear mechanism.
Figure 38:
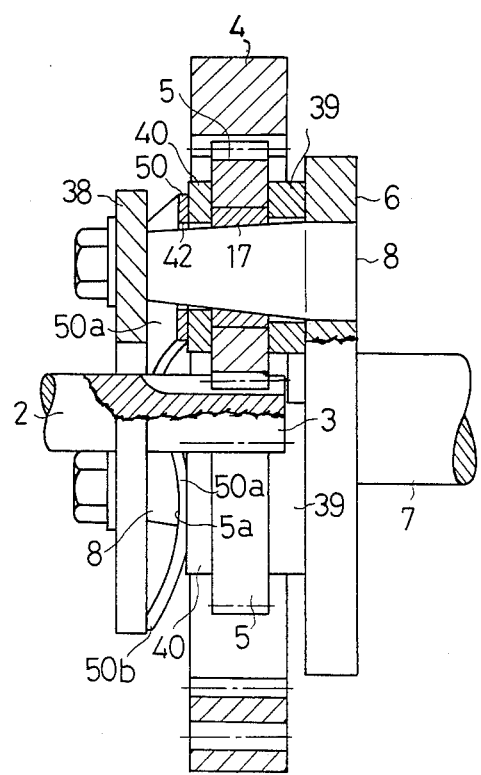

The sixth embodiment will first be described with reference to FIG. 30 to FIG. 35. In this embodiment, a support ring 38 is fixed to the front end of the conical shaft 8 on which the planetary gear 5 is mounted via a collar 39. The spring member 50 (in this embodiment, a belleville spring 50 is employed as shown in FIG. 46 to FIG. 49) is disposed between the support ring 38 and one side of the planetary gear 5 via a collar 40, said spring member 50 being adapted to urge the planetary gear 5 in the direction of the large diameter end of the conical shaft 8. FIG. 32 and FIG. 33, respectively illustrate the planetary gear 5 under light loading conditions; namely, the planetary gear 5 is compressed onto the collar 39 at the large diameter end of the conical shaft 8 by means of the spring member 50. Under such light loading conditions, when large load is applied to the output shaft 7, the planetary gear 5 is moved in a direction of the small diameter end of the conical shaft 8 by a distance a as shown in FIG. 34 and FIG. 35. As a result, the bearing clearance S between the inner peripheral surface of the bearing 17 (in this embodiment, a plain bearing metal is employed) and the outer peripheral surface of the conical shaft 8 becomes large and the center axis of the planetary gear 5 is deviated from that of the conical shaft by a distance e. Further, in case a larger load is applied to any one of the planetary gears 5 than the remaining gears, a distance a of which the planetary gear 5 moves in the axial direction becomes greater for the purpose of reducing such load. For this reason, the distance e in this planetary gear 5 becomes greater than that in the remaining planetary gears 5 and retreats in such a direction to reduce the load. In this state, when the load applied to said particular planetary gear 5 is reduced, the amount of load reduced is applied to the remaining planetary gears 5. As set forth above, the moving distance a in the axial direction of each planetary gear 5 is automatically controlled so as to divide power equally into the three planetary gears 5. Hence, the thrust generated in the planetary gears 15 is balanced with elastic force of the spring member 50 and under these conditions, the planetary gears 5 are rotated.

Figure 31:
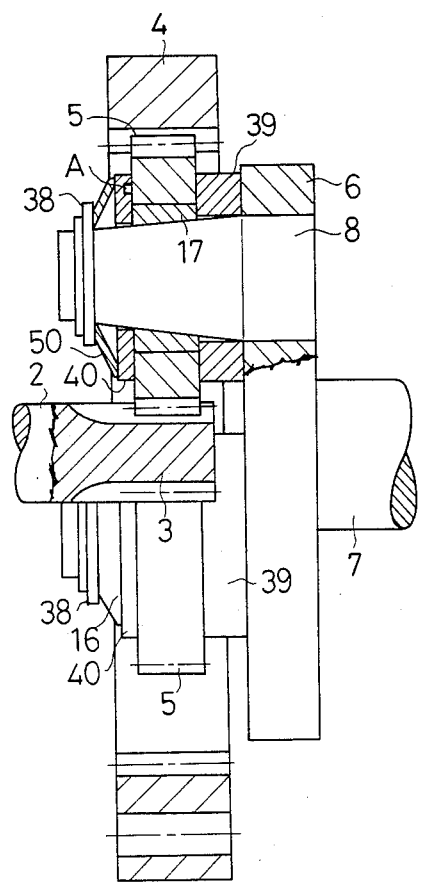
Figure 32:
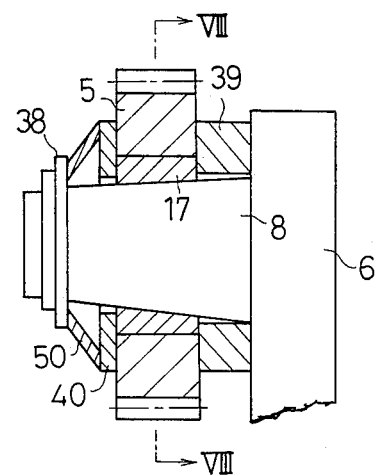

Alternatively, the collar 40 may be provided with a piezoelectric element A at one side thereof facing the planetary gear 5 as shown in FIG. 31. In this case, pressure due to thrust generated in the planetary gears 5 is exerted on the piezoelectric element and the pressure is, then, converted into an electric signal thereby. The amount of thrust is indicated by an ammeter (not shown) in an electric circuit which is electrically connected to the piezoelectric element A.

In the above arrangement, upon provision of the thrust counterbalance means neither spherically convexed surfaces nor spherically concaved surfaces need be formed and the spring member 50 alone will suffice. Accordingly, the gear system is simple in construction and is easy and inexpensive to manufacture.

Figure 36:
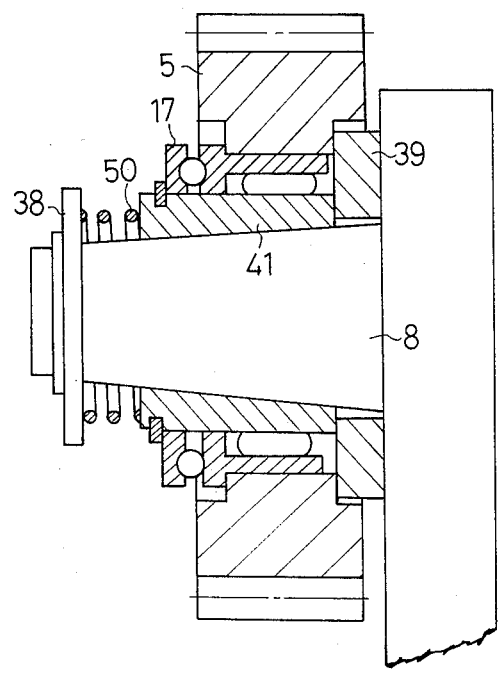
FIG. 36 is a sectional view showing the manner in which the planetary gear is mounted on the conical shaft according to a seventh embodiment of the invention.
Figure 30:
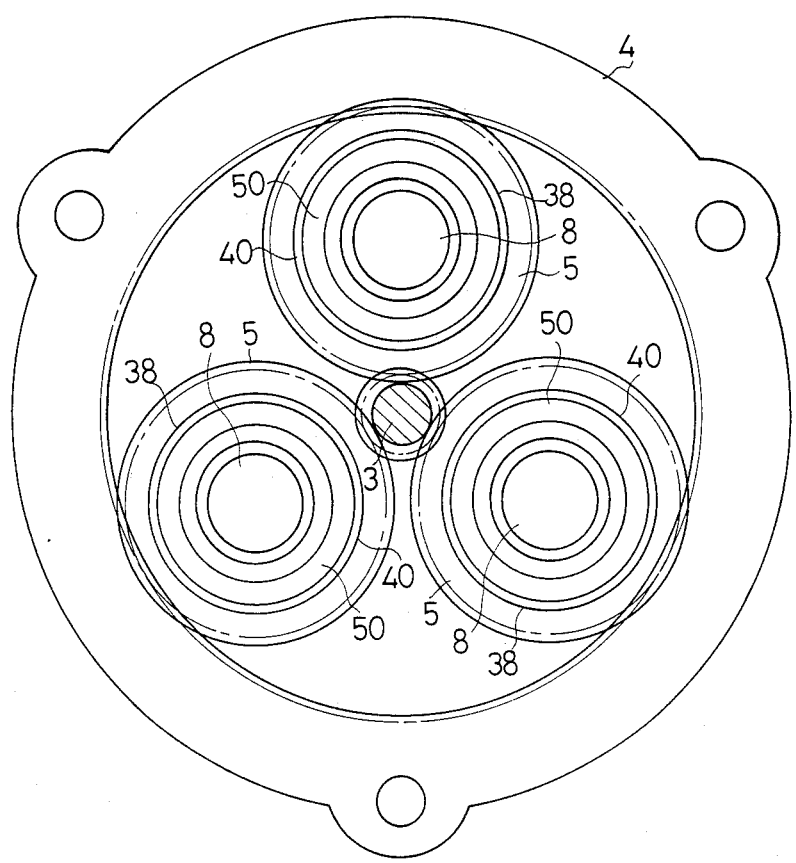
FIG. 30 to FIG. 35 respectively show a sixth embodiment and FIG. 30 is a front view of a planetary gear mechanism.

In the seventh embodiment shown in FIG. 36, the needle roller bearing with the thrust ball bearing serves as the bearing 17. A taper sleeve 41 is fitted between the bearing and the conical shaft 8. The taper sleeve 41 moves on the conical shaft 8, together with the planetary gear 5. In this state, the distance e of which the center axis of the conical shaft 8 is deviated from that of the planetary gear 5 may be changed so as to effect equal division of power in the same manner as in the sixth embodiment. While the belleville spring serves as the spring member 50 for compressing the planetary gear 5 towards the large diameter end of the conical shaft 8 in the sixth embodiment, a helical spring serves as the same in this embodiment.

Figure 39:
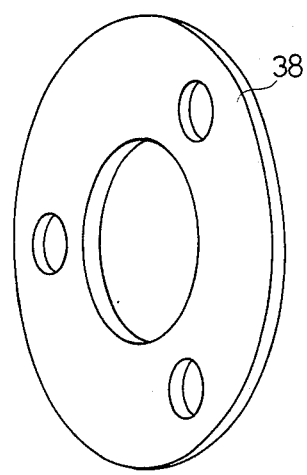
Figure 40:
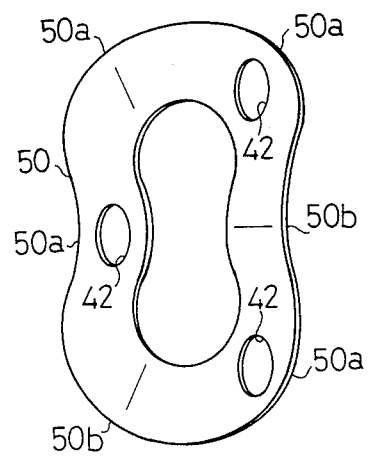

In the sixth and seventh embodiments, the resilient members 16 are respectively independently provided in the planetary gears 5. In the eighth embodiment shown in FIG. 37 to FIG. 41, on the other hand, the respective spring members 50 are integrated into a one piece wave ring spring as shown in FIG. 40. In addition, in the sixth and seventh embodiments, the support rings 38 for supporting the respective spring members 50 are respectively independently provided in the corresponding planetary gears 5. In the eighth embodiment, however, these support rings 38 are integrated into a one piece common support ring as shown in FIG. 39. In the above spring member 50 in the shape of a wave ring, three apertures 42 are formed at 120° intervals and the conical shafts 8 are fitted thereinto. The spring member 50 includes crest portions 50a adjacent each of the apertures 42 and trough portions 50b between the crest portions 50a, thereby forming a wave configuration. Each of the trough portions 50b bears on the common support ring, while one side surface of each of the crest portions 50a is in abutment with one side surface of each of the collars 40 which are, in turn, in contact with the planetary gears 5. In this state, the planetary gears 5 are urged into the large diameter end of the conical shafts 8 whereby the crest portions provide elastic force.

Figure 41:
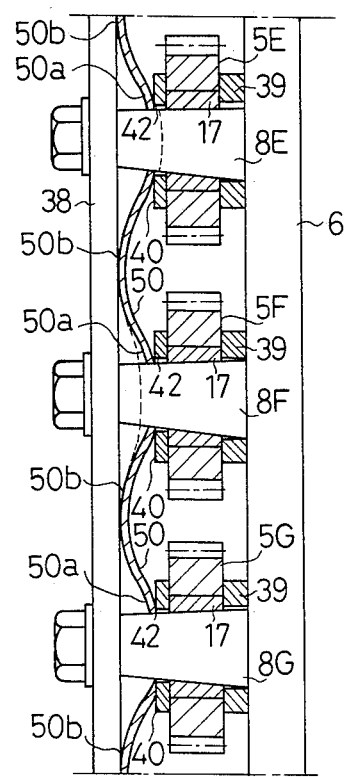

Now, as load applied to a planetary gear 5F increases and the spring member is compressed so as to move to the small diameter end of a conical shaft 8F, the spring member 50 is deformed as shown by the broken line in FIG. 41 to thereby increase thrust under which a planetary gear 5E and a planetary gear 5G are forced towards large diameter ends of the respective conical shafts 8E and 8G. In this manner, equal division of power may positively be effected.

Figure 50:
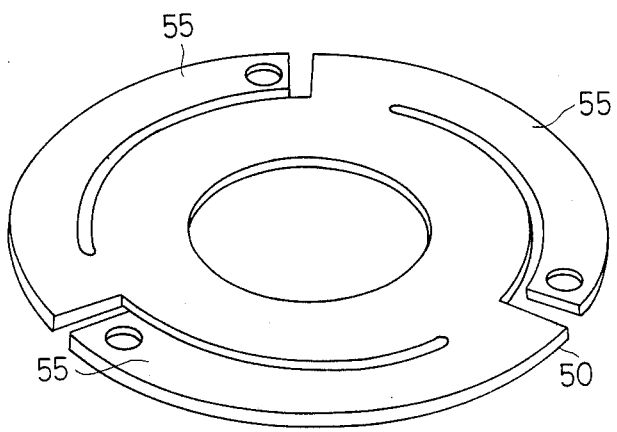
FIG. 50 is a perspective view showing another example of a ring spring.

Alternatively, a ring spring as shown in FIG. 50 may be replaced by the wave ring spring as the spring member 50. This ring spring is formed at its outer periphery with three arm portions 55 which act as a resilient portion. It will be noted that the ring spring functions in a similar manner to the wave ring spring.

Figure 42:
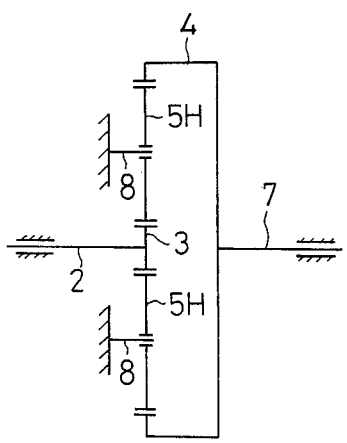
FIG. 42 is a schematic view of a gear system according to a ninth embodiment of the invention.
Figure 43:
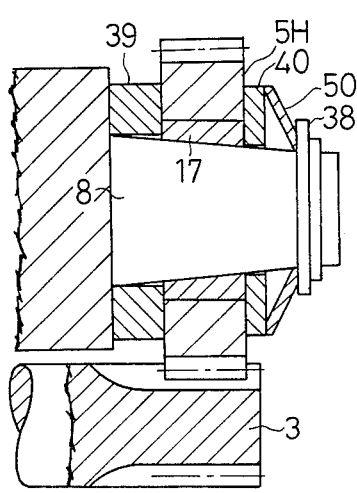
FIG. 43 and FIG. 44 are sectional views, in part, respectively showing the manner in which gears are mounted on the conical shaft according to the above embodiment.
Figure 44:
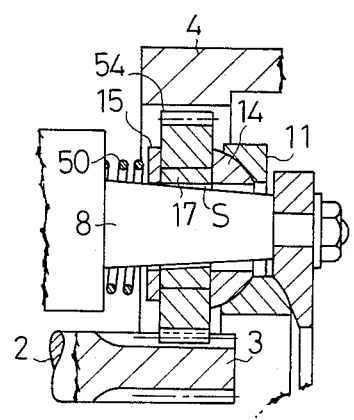
Figure 45:
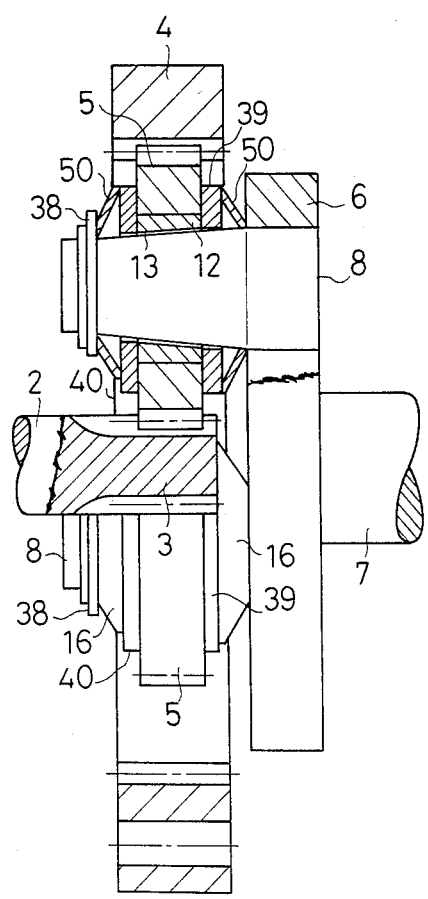
FIG. 45 shows a tenth embodiment of the invention.
Figure 46:
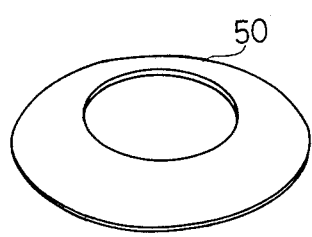
FIG. 46 to FIG. 49 are perspective views respectively of belleville springs.
Figure 47:
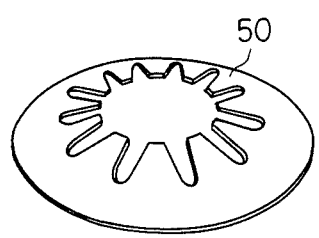
Figure 48:
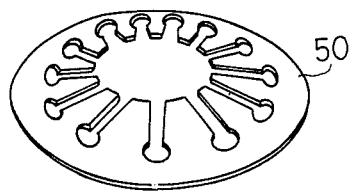
Figure 49:
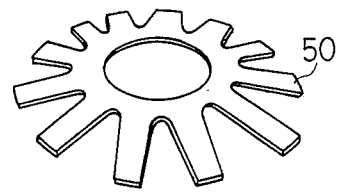

FIG. 42 to FIG. 44 show a ninth embodiment of this invention. This embodiment is applied to a gear system exclusive of the planetary gear mechanism. A plurality of intermediate gears 5H are disposed between the external gear 3 fixed to the input shaft 2 and the internal gear 4 fixed to the output shaft 7 for meshing purposes. The intermediate gears 5H are rotatably supported on the conical shafts 8. As shown in FIG. 44 and FIG. 45, the spring members 50 may be disposed at either the large diameter ends or the small diameter ends of the conical shafts 8, or may be disposed at both ends thereof. Accordingly, directions of thrust applied to the intermediate gears 5H may be selected. It will be appreciated that the first to the eighth embodiment is applicable to this gear system.

FIG. 45 shows a tenth embodiment of this invention. In this embodiment, the spring members 50 are disposed respectively at the large and small ends of the conical shaft 8 so as to urge the planetary gear 5 from both sides. With this arrangement, the planetary gear 5 is positioned at the middle of the conical shaft 8. Accordingly, each of the planetary gears 5 are movable either to the large diameter end or the small diameter end of the conical shaft 8. Thus, equal division of load may readily be effected.

It will be appreciated that this invention is not limited to the embodiments as mentioned above, and is applicable to the following embodiments:

(a) In the above embodiment, the input shaft 2 is operatively associated with the external gear 3 as a sun gear via the external gear directly provided on the input shaft 2. Alternatively, other associating means may be provided between the input shaft 2 and external gear 3. The same is also true of the case in which the carrier is to be operatively associated with the output shaft 7;

(b) A single-stage planetary gear mechanism has been described. Alternatively, two or multistage planetary gear mechanisms may be employed;

(c) In the first to the fifth embodiments, a combination of a spherically convexed surface and a spherically concaved surface as a bearing structure is employed.

Alternatively, it may be a combination of a conical surface and a ball; and (d) Any number of planetary gears 5 may be used, but at least greater than two.

We claim:

1. A gear system comprising a center gear; a plurality of gears each having a center axis and each meshing with said center gear; a plurality of main shafts each having an axis and being in the form of a single cone and each rotatably carrying one of said plurality of gears directly through a bearing having a hole in the form of a single cone, a clearance being provided between an outer surface of each main shaft and a surface of the conical hole associated with each main shaft, whereby any uneven application of load on a carried gear causes said carried gear to move in the axial direction of said main shaft because of a variation in the thrust acting in the axial direction of said main shaft resulting from said uneven application of load and also, in accordance with said axial movement, to move radially becuase of said clearance such that the center axis of said carried gear is deviated from the axis of said main shaft; receiving means for receiving said axial thrust; and a thrust counterbalancing means associated with said receiving means adapted to equalize the load borne by all of said plurality of gears in accordance with the thrusts acting on said plurality of gears.

2. A gear system as claimed in claim 1, wherein said receiving means includes hydraulic means.

3. A gear system as claimed in claim 1, wherein said thrust counterbalancing means is povotally supported at its center and includes thrust backing plates adapted to receive the thrust of the plurality of carried gears in a position corresponding to the position of the plurality of carried gears.

4. A gear system as claimed in claim 1, wherein said receiving means includes a spring member.

5. A gear system as claimed in claim 1, wherein said thrust counterbalancing means is inclined and movably supported at its center and includes a plurality of levers adapted to receive the thrust of the plurality of carried gears in a position corresponding to the position of the plurality of carried gears.

6. A gear system as claimed in claim 5, wherein said thrust counterbalancing means includes a plurality of first levers adapted to receive the thrust of adjacent carried gears via ball-like washers, each of said first levers having a spherically convexed surface formed at a central portion of said first lever, and a second lever having spherically concaved surfaces for engagement with the spherically convexed surfaces of the first levers and a spherically convexed surface for engagement with a spherically concaved surface of a backing plate fixed to the main conical shaft.

7. A gear system as claimed in claim 5, wherein said thrust counterbalancing means includes a lever adapted to receive thrusts generated at two of said plurality of carried gears through two washers, said lever being formed with a spherically convexed surface for engagement with a spherically concaved surface of a backing plate fixed to the main conical shaft.

8. A gear system as claimed in claim 5, wherein said thrust counterbalancing means is pivotally supported centrally and includes thrust backing plates adapted to receive the thrust of the plurality of carried gears in a position corresponding to the position of the plurality of carried gears and the plurality of levers.

9. A gear system comprising a center gear; a plurality of gears each having a center axis and each meshing with said center gear; a plurality of main shafts each having an axis and a conical form and each rotatably carrying one of said plurality of gears directly through a bearing having a conical hole, a clearance being provided between an outer surface of each main shaft and a surface of the conical hole associated with each main shaft, whereby any uneven application of load on a carried gear causes said carried gear to move in the axial direction of said main shaft because of a variation in the thrust acting in the axial direction of said main shaft resulting from said uneven application of load and also, in accordance with said axial movement, to move radially becuase of said clearance such that the center axis of said carried gear is deviated from the axis of said main shaft; receiving means for receiving said axial thrust; and a thrust counterbalancing means associated with said receiving means adapted to equalize the load borne by all of said plurality of gears in accordance with the thrusts acting on said plurality of gears, said thrust counterbalancing means being inclined and movably supported at its center and including a plurality of first levers adapted to receive the thrust of adjacent carried gears via ball-like washers, each of said first levers having a spherically convexed surface formed at a central portion of said first lever, and a second lever having spherically concaved surfaces for engagement with the spherically convexed surfaces of the first levers and a spherically convexed surface for engagement with a spherically concaved surface of a backing plate fixed to the main shaft.

10. A gear system as claimed in claim 9, in which each of the main shafts is in the form of a single cone and each of the bearing holes is in the form of a single cone.

11. A gear system comprising a center gear; a plurality of gears each having a center axis and each meshing with said center gear; a plurality of main shafts each having an axis and a conical form and each rotatably carrying one of said plurality of gears directly through a bearing having a conical hole, a clearance being provided between an outer surface of each main shaft and a surface of the conical hole associated with each main shaft, whereby any uneven application of load on a carried gear causes said carried gear to move in the axial direction of said main shaft because of a variation in the thrust acting in the axial direction of said main shaft resulting from said uneven application of load and also, in accordance with said axial movement, to move radially becuase of said clearance such that the center axis of said carried gear is deviated from the axis of said main shaft; receiving means for receiving said axial thrust; and a thrust counterbalancing means associated with said receiving means adapted to equalize the load borne by all of said plurality of gears in accordance with the thrusts acting on said plurality of gears, said thrust counterbalancing means being inlcined and movably supported at its center and including a plurality of first levers adapted to receive the thrust of the plurality of carried gears, one of the levers being adapted to receive thrusts generated at two of said plurality of carried gears through two washers, said one lever being formed with a spherically convexed surface for engagement with a spherically concaved surface of a backing plate fixed to the main shaft.

12. A gear system as claimed in claim 11, in which each of the main shafts is in the form of a single cone and each of the bearing holes is in the form of a single cone.

13. A gear system comprising a center gear; a plurality of gears each having a center axis and each meshing with said center gear; a plurality of main shafts each having an axis and a conical form and each rotatably carrying one of said plurality of gears directly through a bearing having a conical hole, a clearance being provided between an outer surface of each main shaft and a surface of the conical hole associated with each main shaft, whereby any uneven application of load on a carried gear causes said carried gear to move in the axial direction of said main shaft because of a variation in the thrust acting in the axial direction of said main shaft resulting from said uneven application of load and also, in accordance with said axial movement, to move radially becuase of said clearance such that the center axis of said carried gear is deviated from the axis of said main shaft; receiving means for receiving said axial thrust; and a thrust counterbalancing means associated with said receiving means adapted to equalize the load borne by all of said plurality of gears in accordance with the thrusts acting on said plurality of gears, said thrust counterbalancing means being inclined and pivotally supported centrally and including a plurality of levers adapted to receive the thrust of the plurality of carried gears and further including thrust backing plates adapted to receive the thrust of the plurality of carried gears in a position corresponding to the position of the plurality of carried gears and the plurality of levers.

14. A gear system as claimed in claim 13, in which each of the main shafts is in the form of a single cone and each of the bearing holes is in the form of a single cone.

15. A gear system comprising a center gear; a plurality of gears each having a center axis and each meshing with said center gear; a plurality of main shafts each having an axis and a conical form and each rotatably carrying one of said plurality of gears directly through a bearing having a conical hole, a clearance being provided between an outer surface of each main shaft and a surface of the conical hole associated with each main shaft, whereby any uneven application of load on a carried gear causes said carried gear to move in the axial direction of said main shaft because of a variation in the thrust acting in the axial direction of said main shaft resulting from said uneven application of load and also, in accordance with said axial movement, to move radially becuase of said clearance such that the center axis of said carried gear is deviated from the axis of said main shaft; receiving means for receiving said axial thrust; and a thrust counterbalancing means associated with said receiving means adapted to equalize the load borne by all of said plurality of gears in accordance with the thrusts acting on said plurality of gears, said thrust counterbalancing means being inclined and movably supported at its center and including three levers, each of said three levers having a spherically convexed surface and being adapted to receive the thrust of two adjacent carried gears, and a thrust backing plate having on one side spherically concaved surfaces of the three levers and on another side a spherically convexed surface for engagement with a spherically concaved surface of a backing plate fixed to the main shaft.

16. A gear system as claimed in claim 15, in which each of the main shafts is in the form of a single cone and each of the bearing holes is in the form of a single cone.

* * * * *